Figure 1:
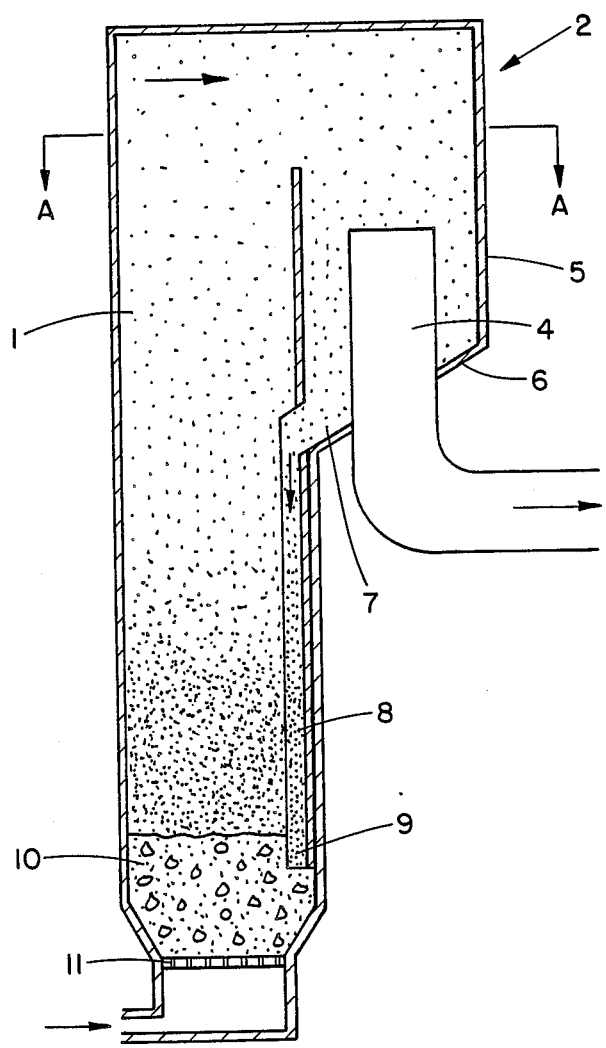

United States Patent [19]

Ruottu

[11] Patent Number: 4,874,584
[45] Date of Patent: Oct. 17, 1989

[54] FLUIDIZED BED REACTOR

[75] Inventor: Seppo Ruottu, Karhula, Finland

[73] Assignee: A. Ahlstrom Osakeyhtio, Karhula, Finland

[21] Appl. No.: 684,016

[22] Filed: Dec. 20, 1984

Related U.S. Application Data

[63] Continuation-in-part of Ser. No. 397,363, Jul. 12, 1982, abandoned.

[51] Int. Cl.$^4$ ............... F27B 15/09; F27B 15/12
[52] U.S. Cl. ................................ 422/145; 55/391; 55/396; 422/147
[58] Field of Search ............ 422/145, 147; 431/7, 431/170; 432/15, 58; 201/31; 55/391, 396

[56] References Cited

U.S. PATENT DOCUMENTS

| | | | |
|---|---|---|---|
| 2,470,395 | 5/1949 | Gohr et al. | 422/147 |
| 3,056,662 | 10/1962 | Ridgway | 55/396 X |
| 3,100,693 | 8/1963 | Klein et al. | 422/147 |
| 3,925,045 | 12/1975 | Cheng | 55/391 X |
| 4,076,796 | 2/1978 | Reh et al. | 422/145 X |
| 4,279,627 | 7/1981 | Paul et al. | 55/396 X |
| 4,311,670 | 1/1982 | Neiminen | 422/147 X |

*Primary Examiner*—Barry S. Richman
*Assistant Examiner*—Amalia L. Santiago
*Attorney, Agent, or Firm*—Bucknam and Archer

[57] ABSTRACT

A fluidized bed reactor in which the gases flowing tangentially through a pipe from the upper part of the reactor chamber to a cyclone separator are discharged through a discharge pipe of the separator. The discharge pipe is arranged to go through the bottom of the cylindrical vortex chamber. The separated solids flow through the return pipe to the lower part of the reactor chamber. The discharge end of the return pipe is disposed inside the lower fluidized bed zone being formed on the bottom of the reactor chamber.

6 Claims, 2 Drawing Sheets

FLUIDIZED BED REACTOR

This application is a continuation in part of application Ser. No. 397,363, filed July 12, 1982, now abandoned.

The present invention relates to a fluidized bed reactor, in the upper part of a reactor chamber of which there is an outlet connected to a vortex chamber of a cyclone separator by means of a pipe tangentially connected thereto for separating solids entrained by the gases being discharged from the fluidized bed reactor, and which comprises a return pipe for the separated solids, this pipe being connected to the lower part of the separator, and a gas discharge pipe disposed in the separator.

Fast fluidized bed technique utilizing solids circulation has been applied for a long time e.g. in roasting processes and nowadays more widely in various kinds of reactors, such as combustion chambers and gasifiers. In known applications, the separation of solids from the gases occurs in a conventional cyclone separator having a hopper-shaped lower part. The separator has a cylindrical vortex chamber in which there is disposed a gas discharge pipe conveying gases upwards and from which the solids are returned to the reactor through a gas lock. The duty of the gas lock is to prevent the reactor gases from flowing to the cyclone through the discharge pipe. Usually a mechanical locking device or in more developed equipment sand hovering in a U-tube acts as a gas lock of this kind. Especially in high-temperature-reactors the system for returning the solids is complicated and expensive. The fact that part of the air required for fluidization in the gas lock flows upwardly in the discharge pipe has a disadvangeous effect especially on the separation of light and fine-grained material. Moreover, a rising gas flow decreases the transport capacity of the discharge pipe.

It is known that a very low pressure and a high axial flow velocity are formed in the center of a conventional cyclone. Due to this, a conventional cyclone tends to suck from the stand pipe. The suction flow formed does not usually have a tangential velocity, so almost all the solids entrained by it are discharged through the central pipe of the cyclone. A return system provided with a conventional cyclone is thus very sensitive to the suction flows of the return pipe and requires an absolutely reliable gas lock. In steam boiler applications the use of a conventional cyclone leads to a disadvantageous structure, as the conventional cyclone divides the boiler into a separate combustion chamber and a convection part positioned after the cyclone, between which there is disposed equipment for returning the solid material.

Mechanical gas locks wear quickly, especially under hot conditions and they often suffer from operational disturbances.

It is also known to dispose a conventional cyclone inside a reactor, whereby the entire system for returning the solids is situated inside the reactor. The big drawbacks of this system are the corrosion and erosion problems of the cyclone, as the cooling of the supporting structure cannot be arranged by simple means. Moreover, the system suffers from the sensitivity of the conventional cyclone to the suction flows of the return pipe.

It is possible to eliminate the defects of the above mentioned apparatus by means of a simple apparatus according to the invention which is characterized in that the gas discharge pipe is arranged to go through the bottom and to direct downwards the gases from which solid material has been removed.

In order to achieve separation of the solids, the diameter of the gas discharge should not exceed 0.6 D and preferably be 0.3–0.4 D, where D is the diameter of the cylindrical vortex chamber.

Figure 2:
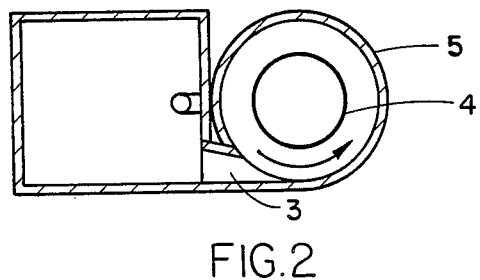
Figure 3:
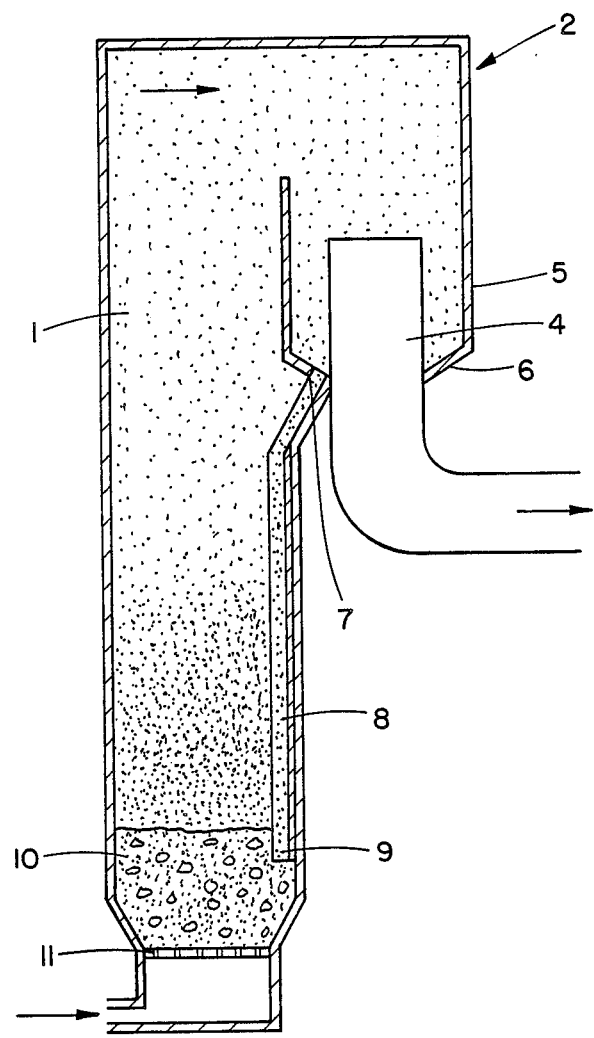

The invention is described in more detail in the following with reference to the accompanying drawing, in which FIG. 1 shows a vertical section of the apparatus, FIG. 2 shows a section as taken on line A—A of FIG. 1, and FIG. 3 shows a vertical section of another embodiment of the invention wherein the vortex chamber has a conical bottom.

In FIG. 1 the reference number 1 refers to a reactor chamber operating according to the fluidized bed principle and 2 to a cyclone separator in which the gases flowing tangentially from the upper part of the reactor through a nozzle 3 are discharged through a discharge pipe 4. The solid material separated onto the walls of a cylindrical vortex chamber 5 flows down to the bottom 6 of the cyclone which is inclined so that the lowest point of the bottom is adjacent to the reactor 1. Through an opening 7 the solid material flows via a return pipe 8 to the lower part of the reactor chamber 1. The lower part 9 of the pipe, i.e., the discharge end, is disposed inside a dense, lower fluidized bed zone 10 formed on the bottom 11.

As for the flow regime, a flow-through cyclone according to the invention differs from the conventional cyclone in the respect that the vacuum vortex formed in the center of the cyclone is always directed together with the main flow towards the gas discharge pipe 4. This alone decreases the suction effect of the cyclone when compared to a conventional solution. The axial and radial velocities prevailing in the lower part of a flow-through reactor are low, but the tangential velocity is high. Thus the dust entrained by an eventual suction flow cannot get into the discharge pipe 4 but is separated onto the walls and returned to the reactor 1. This system operates more stably than the known ones in case of instantaneous disturbances.

FIG. 3 discloses another embodiment of the invention which is substantially identical to the embodiment of FIG. 1 except that the bottom 6 of the cyclone separator 2 has a conical shape rather than being planar and inclined as in FIG. 1 and the opening 7 to the return pipe 8 is differently configured so as to assure that the solid material will flow down through the pipe to the reactor chamber 1. In this embodiment, reference numeral 2 refers to a reactor chamber operating according to the fluidized bed principle and reference numeral 2 refers to a cyclone separator in which the gases flowing tangentially from the upper part of the reactor through a nozzle 3 are discharged through the discharge pipe 4. The solid material separated onto the walls of a cylindrical vortex chamber 5 flows down to the bottom 6 of the cyclone separator which is conically shaped. As mentioned heretofore, the solid material flows through a return pipe 8 to the lower part of the reactor chamber 1. The lower part 9 of the return pipe 8, i.e., the discharge end, is disposed inside a dense, lower fluidized bed zone 10 formed on the bottom 11.

When using a flow-through cyclone, there is no need to transport the solids horizontally and the return pipe is an open, direct pipe the lower end of which extends into the fluidized bed. Due to this:

the fluidized bed which is formed in the reactor acts at the same time as a gas lock, so there is no need for a separate gas lock.

a downward gas flow is achieved in the return pipe, due to which the carrying capacity of the return pipe increases and the separation ability improves especially as regards small particles which cannnot settle against the gas flow.

The system according to the invention brings about obvious structural advantages, such as external return means can be replaced by a simple and inexpensive pipe positioned inside the reactor and the cooling of which can be easily arranged, if required the present solution is especially suitable for the structural requirements of steam boilers. Thus the combustion chamber and the convection part situated after the separator can be manufactured at an engineering workshop as one piece. For cooling the return pipe in a boiler application, it is sufficient to position the pipe adjacent a wall which is cooled.

EXAMPLE

A gasifier as shown in FIG. 1, having the following operational values:

| Dry peat, wood or coal | 100 g/s dry matter cont. $\geq$ 80% |
|---|---|
| Air | 7 mol/s |
| Product gas | 16 mol/s |
| Dust content of the gas | 10–30 kg/m$^3$N |
| Reactor temperature | 900–1000 °C. |
| Air temp. before the reactor | 300–400 °C. |
| Average particle size of the sand | 150 m |
| Main dimensions | |
| reactor diameter | 0,6 m |
| reactor height | 11,0 m |
| cyclone diameter | 0,6 m |
| diameter of the discharge pipe | 0,3 m |
| diameter of the return pipe | 0,1 m |
| cyclone height | 2,0 m |

The material of the return pipe is fire-proof steel and the structure uncooled. The trial runs have shown that the apparatus operates well. The separation ability of the cyclone has been in practise 100% for the circulation material used.

We claim:

1. In a fluidized bed reactor wherein solid particles are entrained by gases flowing through the reactor, solids are separated from the gases and are returned to the lower part of the fluidized bed reactor, said reactor having in the upper part a chamber, a cyclone separator connected to said chamber, said cyclone separator having a vortex chamber, a return pipe for returning the solids separated from the gases to the lower part of the fluidized bed reactor, a discharge pipe for removal of the gases, the improvement which comprises the vortex chamber being inclined towards the reactor, the gas discharge pipe going through the bottom of the vortex chamber and directing downwards the gases from which the solid material has been removed, the gas discharge pipe is arranged so that its walls form a cylindrical partition between the solid particles and the gas in the bottom of the vortex chamber, and the discharge pipe has a diameter not less than 0.25D and not greater than 0.6D, wherein D is the diameter of said vortex chamber.

2. In the fluidized bed reactor according to claim 1, wherein the improvement further comprises the diameter of the cylindrical partition being 0.3 D to 0.4 D.

3. In the fluidized bed reactor according to claim 1, wherein the improvement further comprises the bottom of the vortex chamber being substantially planar.

4. In the fluidized bed reactor according to claim 1 wherein the improvement further comprises said return pipe being located within the reactor.

5. In the fluidized bed reactor according to claim 1, wherein the improvement further comprises the bottom of the vortex chamber being conical in shape.

6. In the fluidized bed reactor according to claim 1, wherein the improvement further comprises the fluidized bed reactor having a lower fluidized bed zone formed on the bottom of the reactor and the return pipe extending into said lower fluidized bed zone.

* * * * *